(12) United States Patent
Cho et al.

(10) Patent No.: US 7,388,915 B2
(45) Date of Patent: Jun. 17, 2008

(54) VIDEO DATA CODING/DECODING APPARATUS AND METHOD

(75) Inventors: Hyun Duk Cho, Kyungki-Do (KR); Sung Deuk Kim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 612 days.

(21) Appl. No.: 10/002,404

(22) Filed: Dec. 5, 2001

(65) Prior Publication Data

US 2004/0247033 A1 Dec. 9, 2004

(30) Foreign Application Priority Data

Dec. 6, 2000 (KR) .............................. 2000-73695

(51) Int. Cl.
*H04N 7/12* (2006.01)
(52) U.S. Cl. .................................. 375/240.26
(58) Field of Classification Search ............ 348/434.1, 348/441, 461, 403, 419, 416, 384, 521, 522, 348/525; 375/240.26, 240.29, 240.24, 240.23, 375/240.27, 240.16, 240.28; 382/239, 243, 382/234, 232, 282
See application file for complete search history.

(56) References Cited

U.S. PATENT DOCUMENTS

| | | | | |
|---|---|---|---|---|
| 5,426,463 A | * | 6/1995 | Reininger et al. ........... | 348/405 |
| 6,289,297 B1 | | 9/2001 | Bahl | |
| 6,292,917 B1 | | 9/2001 | Sinha et al. | |
| 6,301,558 B1 | | 10/2001 | Isozaki | |
| 6,539,121 B1 | * | 3/2003 | Haskell et al. ............... | 382/239 |
| 6,754,277 B1 | * | 6/2004 | Heinzelman et al. ... | 375/240.27 |
| 6,757,851 B1 | * | 6/2004 | Park et al. ..................... | 714/48 |
| 6,768,775 B1 | * | 7/2004 | Wen et al. .............. | 375/240.23 |
| 6,904,990 B2 | | 6/2005 | Etou | |
| 7,012,962 B1 | * | 3/2006 | Cho et al. .............. | 375/240.26 |
| 2002/0018565 A1 | * | 2/2002 | Luttrell et al. .............. | 380/217 |
| 2002/0114397 A1 | * | 8/2002 | Todo et al. ............. | 375/240.29 |
| 2003/0128755 A1 | | 7/2003 | Wen | |
| 2006/0013321 A1 | * | 1/2006 | Sekiguchi et al. ...... | 375/240.27 |

FOREIGN PATENT DOCUMENTS

| | | |
|---|---|---|
| CN | 1238644 A | 12/1998 |
| CN | 1263422 A | 11/1999 |

* cited by examiner

*Primary Examiner*—Tung Vo
*Assistant Examiner*—Behrooz Senfi
(74) *Attorney, Agent, or Firm*—Ked & Associates, LLP

(57) ABSTRACT

A video data coding/decoding apparatus includes: an encoder dividing a partition partitioned by a data partitioning technique into certain blocks, channel-coding the divided block data and transmitting a bit stream; and a decoder channel-decoding the bit stream received from the encoder so as to restore a video data. An error occurrence probability can be reduced by channel decoding the source-coded video data for each partition. In addition, by removing the marker emulation generated in the channel coding, a mobile image data of a better picture quality can be provided.

31 Claims, 12 Drawing Sheets

FIG. 4
| PARTITION TABLE | | |
|---|---|---|
| FIELD NAME | REQUIRED NUMBER OF BITS | CONTENTS |
| B1 | 5 | PARTITION 1 SIZE(HEADER INFORMATION) |
| B2 | 6 | PARTITION 2 SIZE(MV) |
| B3 | 13 | PARTITION 3 SIZE(DCT) |
FIG. 5
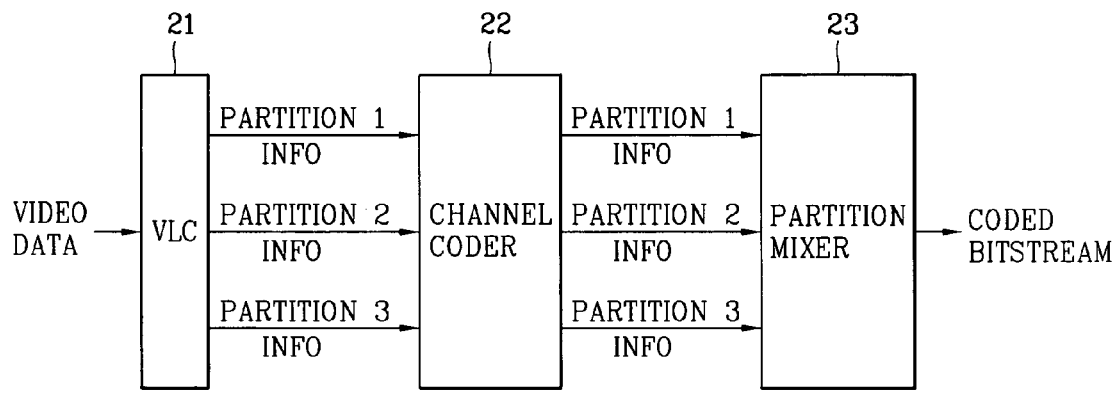
FIG. 6
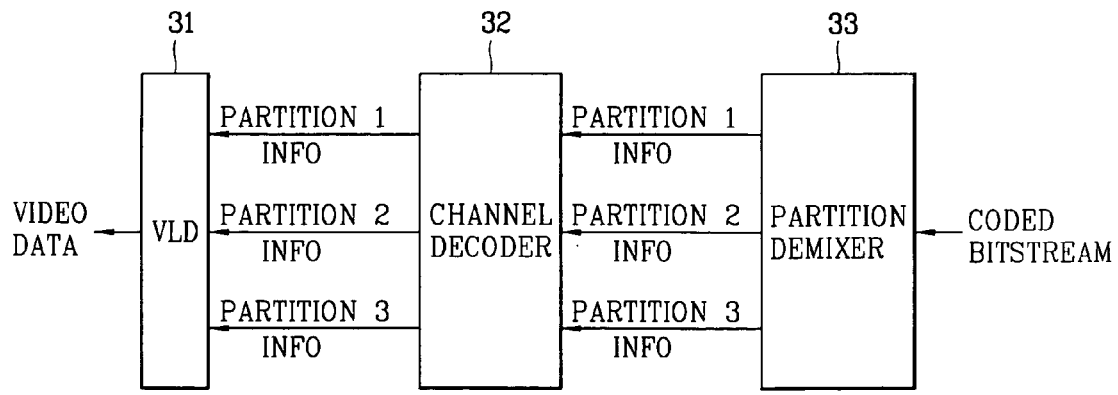

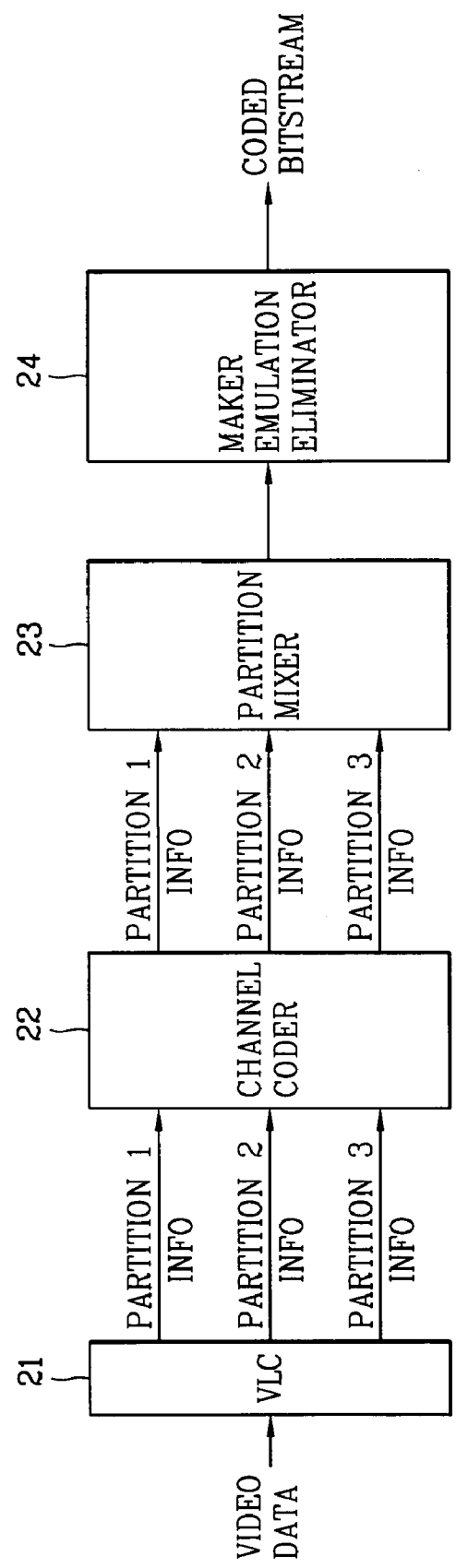

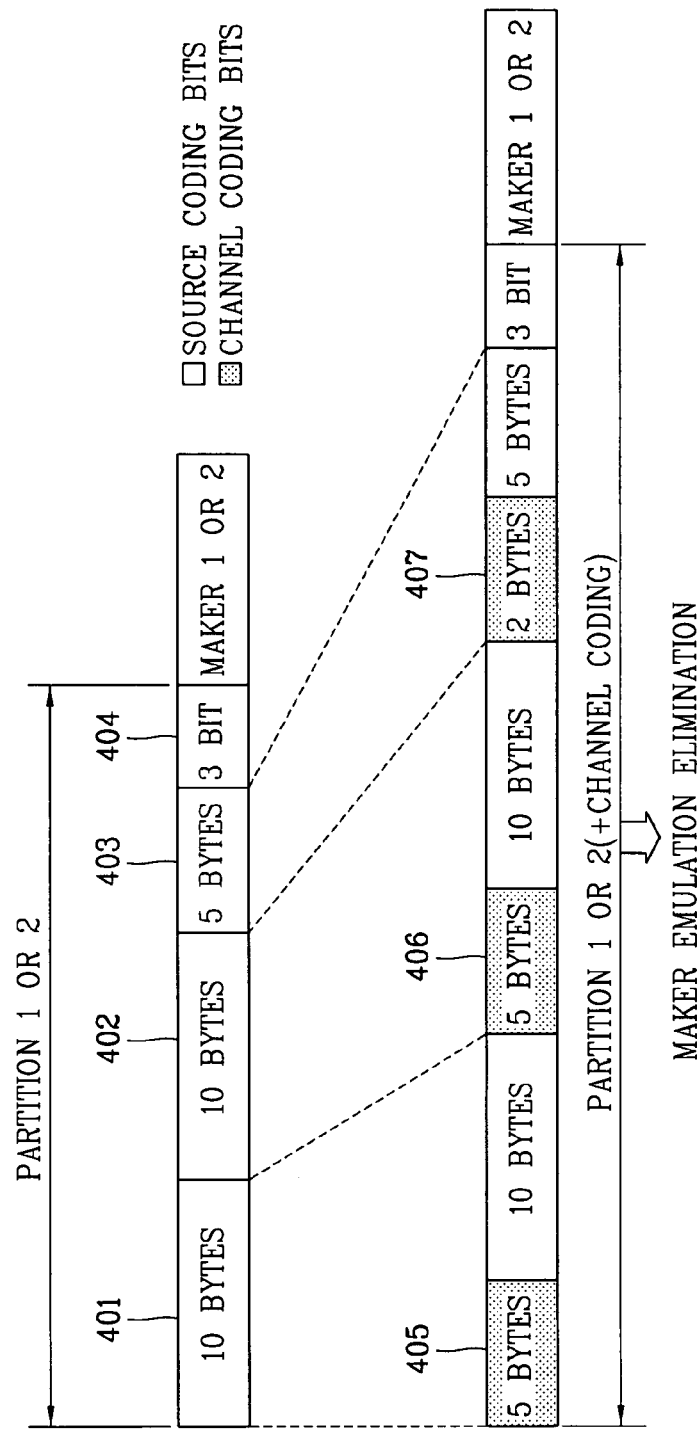

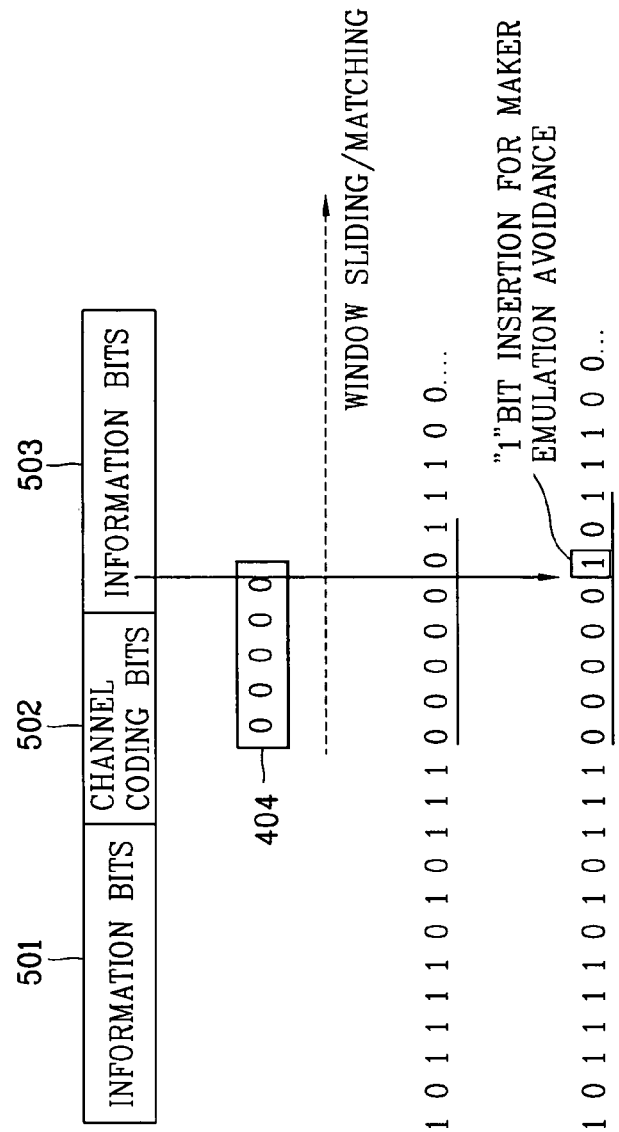

VIDEO DATA CODING/DECODING APPARATUS AND METHOD

BACKGROUND OF THE INVENTION

1. Field of the Invention

The present invention relates to a data partitioning technique-based image compressing method, and more particularly, to a video data coding and decoding apparatus and method for performing an unequal error protection for each partition in image compression.

2. Description of the Background Art

Currently, the next-generation mobile communication system requires a reliable transmission of a high speed multimedia data, for which an intense channel coding and effective modulation method are in demand.

An international mobile telecommunication (IMT)-2000 system which is to be soon realized for a commercial use as the next-generation mobile communication system is a personal globalize multi-service that has standardized various mobile communication systems which had been individually and differently operated by countries so that a user can use the service by using one terminal or a user access card from any place in the world.

In addition, the IMT-2000 system allows a terminal, which ensures a reliable connection quality in various radio signal environment and provides various service of voice/image information and data, to be globally roamed by utilizing the worldwide standardization and the same frequency.

Since the IMT-2000 system can provide high bit rate up to 2 Mbps, it can give us rich multimedia service. And, video application such as video telephony and video surveillance system will be one of killer applications in IMT-2000 services.

FIG. 1 is a schematic view of a conventional H.263 video codec.

As shown in FIG. 1, the conventional H.263 video codec includes an encoder 20 and a decoder 30.

The encoder 20 includes a variable length coder (VLC) 21 which produces variable length bitstream so as to minimize the size of transmitting data.

The decoder 30 includes a variable length decoder (VLD) 31 for source-coding the received coded bit stream so as to restore a video data.

The conventional method in FIG. 1 is so vulnerable to channel error that it may severely reduce the video quality. More specifically, the method does not classify contents of bitstreams according to their importance. So, when less important bits are corrupted, it is very difficult to conceal the error using more important bits (i.e. to recover the image as close to the original image to possible).

In order to solve this problem, the data partitioning method was proposed. FIG. 1 shows the block diagram of the method.

In this method, the variable length coder (VLC) 21 gives the partition mixer 23 partition data. And then, the partition mixer inserts markers and output a coded bit stream.

The partition demixer 33 detects markers and provides partition data to the variable length decoder (VLD) 31.

A video data coding method using the data partitioning technique in the thusly constructed H.263 video codec will now be described.

When a video data is inputted, the VLC 21 of the encoder 20 source-codes the video data and compresses it. And then the VLC 21 partitions the source-coded video data into a plurality of partitions by using a data partitioning technique.

As the partitioning is completed, the encoder 20 inserts a marker into each partition data (a source coding bit), mixes it, and transmits a bit stream with a structure as shown in FIG. 2 to a destination.

The structure of the bit stream, as shown in FIG. 2, includes a slice start code (SSC) 101 indicative of starting of slice, a partition 1 (102), that is, a header containing an information bit, a partition 2 (104) having motion vector (MV) information, a partition 3 (106) having a discrete cosine transform (DCT) coefficient, markers 1 and 2 (103 and 105) for identifying each partition, and a zero bit inserting portion 107 for a byte-aligning.

The VLC 21 marks the boundaries between the partitions 1, 2 and 3 (102, 104 and 106) by inserting the markers 1 and 2 (103 and 105) between the partitioned partitions (102, 104 and 106). The partition 1 is set to have the highest importance, and partitions 2 and 3 are set to have less importance.

Accordingly, even if one partition is damaged due to a channel error, the VLD 31 of the decoder 30 can restore a video data to be as close as possible to the original video data as possible by using the information of the remaining partitions.

That is, if the partition 3 (106) is damaged while being transmitted, the VLD 31 would restore the video data by using the information of the partition 1 (102) and the partition 2 (104). If the partition 2 is damaged, the VLD 31 may restore the video data by using the information of the partition 1 (102).

In this respect, however, if the partition 1 (102) is damaged, the VLD 31 may not restore the original video data with the information of the slice.

As for the mobile data coding method using the conventional partitioning technique, though it is able to prevent error propagation between partitions by partitioning the source-coded video data into a plurality of partitions and inserting the markers between the partitioned partitions, it basically fails to protect the important partition information from an error.

In addition, in the conventional art, if the channel coding is directly adopted to each partition without any consideration, the channel coder might generate the same code with the marker so that the decoder might recognize it as the marker and that makes the decoder work incorrectly.

The above references are incorporated by reference herein where appropriate for appropriate teachings of additional or alternative details, features and/or technical background.

SUMMARY OF THE INVENTION

Therefore, an object of the present invention is to provide a video data coding/decoding apparatus and method that are capable of lowering an error occurrence probability by performing an unequal error protection for each partition.

Another object of the present invention is to provide a video data coding/decoding apparatus and method that are capable of providing an intense error protection performance by performing a channel coding for each partition.

Still another object of the present invention is to provide a video data coding/decoding apparatus and method that keeps the decoder from the incorrect decoding by removing a marker emulation generated in channel coding.

To achieve at least the above objects in whole or in parts, there is provided a video data coding/decoding apparatus including: an encoder dividing a partition partitioned by a data partitioning technique into certain blocks, channel-coding the divided block data and transmitting a bit stream; and a decoder channel-decoding the bit stream received from the encoder so as to restore a video data.
}

In the video data coding/decoding apparatus of the present invention, in order to remove a marker emulation which makes it impossible for the decoder to perform a decoding when the channel coding is adopted, a partition table or a bit insertion method is employed.

To achieve at least these advantages in whole or in parts, there is further provided a video data coding method including the steps: partitioning a source-coded video data into a plurality of partitions and dividing each partition into certain blocks according to a predetermined block size; inserting a channel coding byte into each divided block and channel-coding a partition data; and mixing a partition table storing size information of the partition and the channel coded partitions so as to form a bit stream.

To achieve at least these advantages in whole or in parts, there is further provided a video data coding method including the steps: inserting a marker into a source-coded video data, partitioning it into a plurality of partitions, and dividing each partition into certain block according to a predetermined block size; channel-coding the partition data of the divided blocks; mixing the plurality of channel-coded partitions; and checking whether a marker emulation has occurred in the mixed partitions and performing a process to avoid a marker emulation.

To achieve at least these advantages in whole or in parts, there is further provided a video data decoding method including the steps: partitioning a bit stream into a plurality of partitions with reference to a partition table included in the received bit stream; channel-coding each partition data according to an index of a CCRT and outputting the source-coded partition; and mixing the source-coded partitions and performing a source-decoding on the partitions so as to restore an original video data.

To achieve at least these advantages in whole or in parts, there is further provided a video data decoding method including the steps: inserting a marker into a source-coded video data, partitioning it into a plurality of partitions, and dividing each partition into certain blocks according to a predetermined block size; channel-coding a partition data of the divided blocks; mixing the plurality of channel-coded partitions; checking whether a marker emulation has occurred in the mixed partitions and performing a process to avoid a marker emulation; and forcefully inserting an information bit termination bit having the size of 1 bit at the end of an information bit of a partition 3 so as to recognize a zero bit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 4 is a drawing illustrating a partition table structure of FIG. 3 in accordance with the first embodiment of the present invention;

FIG. 5 is a schematic block diagram of a video encoder for implementing a video data coding-method using the partition table in accordance with the first embodiment of the present invention;

FIG. 6 is a schematic block diagram of a video decoder for implementing a video data coding method using the partition table in accordance with the first embodiment of the present invention;

FIG. 8 is a schematic block diagram of a video encoder for implementing the video data coding method using a marker in accordance with the second embodiment of the present invention;

FIGS. 9A and 9B are drawings illustrating a bit stream structure of a channel-coded video data of FIG. 8 in accordance with the second embodiment of the present invention;

FIGS. 11A through 11C are drawings illustrating one embodiment for removing a marker emulation of FIG. 8 in accordance with the second embodiment of the present invention;

DETAILED DESCRIPTION OF THE PREFERRED EMBODIMENTS

In the present invention, a channel coding for an unequal error protection is performed on each partition. As the channel coding, there are a blocking coding method including a reed-solomon coding and a convolutional coding method. The present invention provides a video data coding method adopting the data reed-solomon coding.

First, a video data coding method of the present invention adopting the reed-solomon coding is roughly divided into a method using a partition table and a method using a marker.

Figure 1:
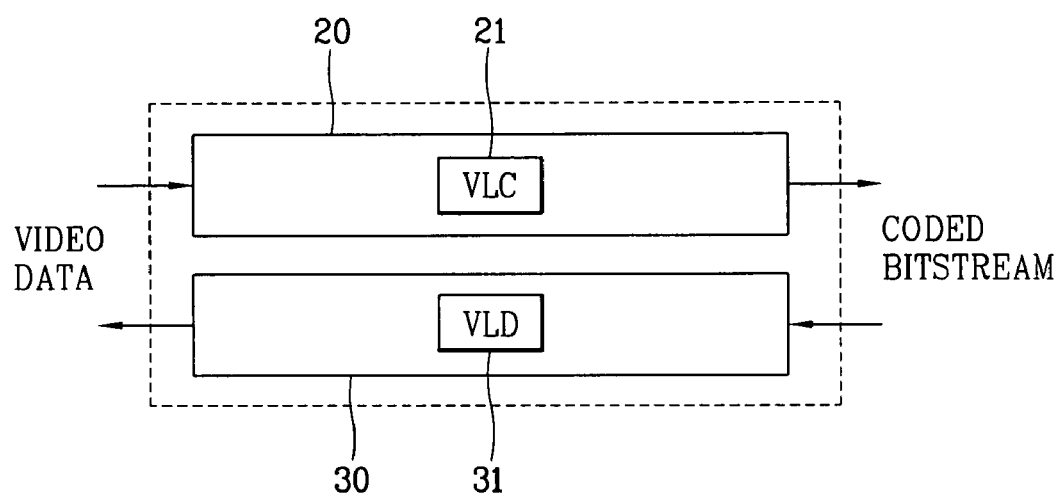
FIG. 1 is a schematic block diagram of conventional H.263 video codecs.
Figure 2:
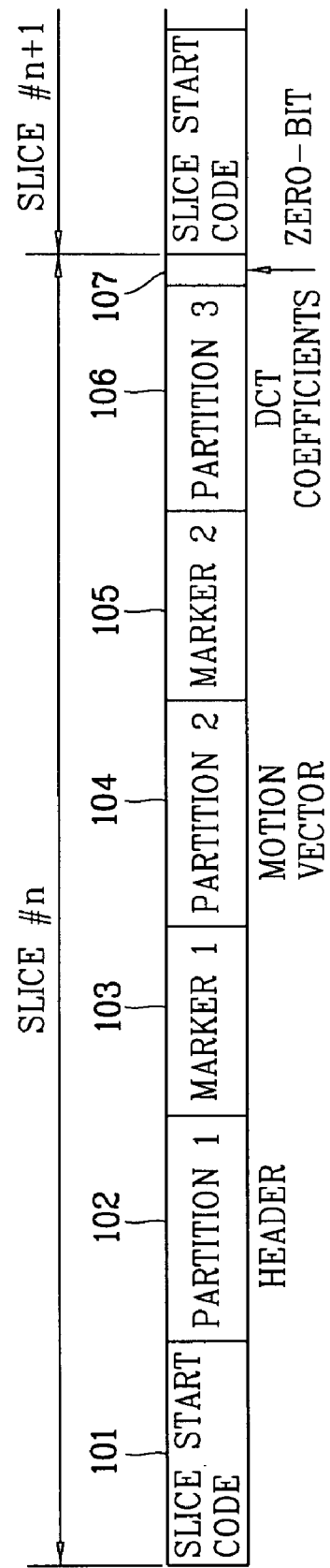
FIG. 2 is a drawing illustrating a bit stream structure coded by using a data partitioning technique of FIG. 1.
Figure 3:
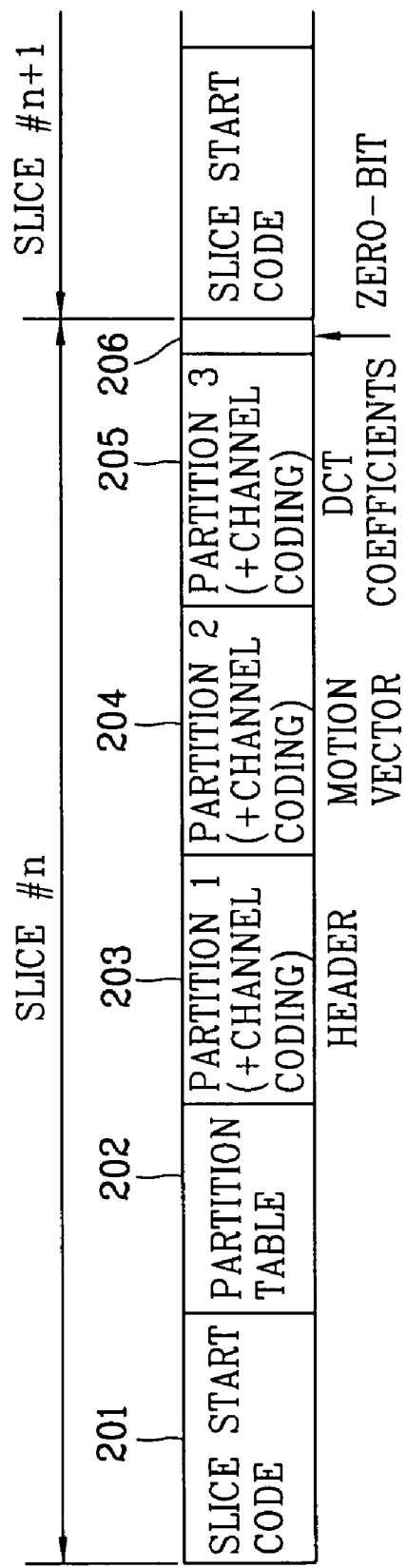
FIG. 3 is a drawing illustrating a bit stream structure for showing a video data coding method using a partition table in accordance with a first embodiment of the present invention.

The video data coding method using the partition table is that, rather than inserting a marker for identifying partitions, as shown in FIG. 3, size information of partitions 1, 2 and 3 203, 204 and 205 are stored in a partition table and transmitted so that a decoder can identify each partition 1, 2 and 3 203, 204 and 205 according to the size information of the partitions.

FIG. 4 illustrates one example of the partition table 202.

As shown in FIG. 4, if the size of the partition 1 is 3 byte, 00011 is stored in a field B1. If the size of the partition 2 is 10 byte, 001010 is stored in a field B2. If the size of the partition 3 is 255 byte, 0000011111111 is stored in a field B3. Accordingly, the total size information stored in the partition table 202 is 000110010100000011111111.

As shown in FIG. 5, the video data coding method using the partition table can be easily performed by an encoder in which a channel coder 22 and a partition mixer 23 are connected to the next stage of a variable length coder (VLC) 21.

Thus, the video data coding method using the partition table allows the partition to be identified even without having a marker, and as shown in FIG. 6, advantageously, a decoder can be easily implemented by sequentially connecting a channel decoder 32 and a partition demixer 33 at the next stage of the variable length decoder (VLD) 31.

That is, in case where the marker is used, the partition data is to be decoded after finding the marker. Thus, the conventional decoder is disadvantageous in that it temporarily stores the partition data in a buffer, finds the marker and reads again the partition data for processing.

Comparatively, in case of using the partition table 202, the decoder of the present invention can previously recognize the size information of the partitions 1~3 203~205 and directly perform a channel-decoding on the partitions 1~3 203~205.

The video data coding method using the partition table will now be described in detail.

The channel coding (the reed-solomon coding) method adopted to a partition data typically uses a block coding. Thus, in channel coding, the partition data should be first divided by a block unit.

Accordingly, as shown in FIG. 5, if the size of a partition is smaller than a predetermined block size, the VLC 21 forms one partition to be one block for the one partition. In this respect, since the size of the partition 1 is generally small, the partition 1 forms one block, and in case of the partition 2, one block is formed for an image with less motion.

As the partition data is divided by a block unit by the VLC 21, the channel coder 22 performs a channel coding of a certain rate for the divided partition data, that is, inserts a channel coding bit having a strong error protection capacity.

Namely, since the encoder and the decoder have a mutually predetermined CCRT of their own, they transmit an index of the CCRT to each other and performs an encoding and a decoding with the rate corresponding to the index of the CCRT.

At this time, the channel coding is performed by a byte unit, and the channel coder 22 does not apply a channel coding to any remaining bits which fail to establish a byte unit.

In this manner, as the additional bit for an unequal error protection is inserted into each partition, information loss can be relatively reduced in an error-prone transmission environment.

The number of channel coding bytes inserted by the channel coder 22 is computed by equation (1) below:

$$\text{The number of channel coding bytes} = \text{Trunc}(I*CCRT[\text{index}]) \quad (1)$$

wherein 'I' indicates an information byte, CCRT[index] indicates a channel coding rate and Trunc indicates a truncation operator.

FIG. 9A is one example of a partition data divided into 10 byte block size (BLS). When a channel coding is performed on the partition data (the source coding bit) of each of the blocks (401~403) in case that CCRT is 0.5, the numbers of channel coding bytes are respectively 5 byte, 5 byte and 3 byte.

Therefore, by differentiating the error protection level by the data partitions, a probability of occurrence of an error for an important data domain can be more lowered down.

Accordingly, the partition mixer 23 mixes the channel-coded partitions 1, 2 and 3 to form a bit stream structure as shown in FIG. 3 and transmits it to a destination.

With reference to FIG. 6, when the coded bit stream is inputted to a decoder of the destination, the demixer 33 of the decoder partitions the coded bit stream into a plurality of partitions 1,2, and 3 202,203 and 204 by using the size information of each partition 1~3 203~205 stored in the partition table 202, and outputs them to the channel coder 22.

Then, the channel decoder 32 channel-decodes the data of each of the divided partitions 1, 2 and 3 202, 203 and 204 according to the CCRT [index=0.5] and outputs the source-coded partition data to the VLD 31.

The VLD 31 mixes the source-coded partition data and performs a source-decoding, so as to restore an original video data.

In this respect, however, in the video data coding method using the partition table, since the partition table should cover a maximum value of the information amount generated from each partition, the partition table is lengthened longer than the marker of the conventional art. Thus, it may be said that the video data coding method using the marker is better than the video data coding method using the partition table in the aspect of a compression efficiency.

Figure 7:
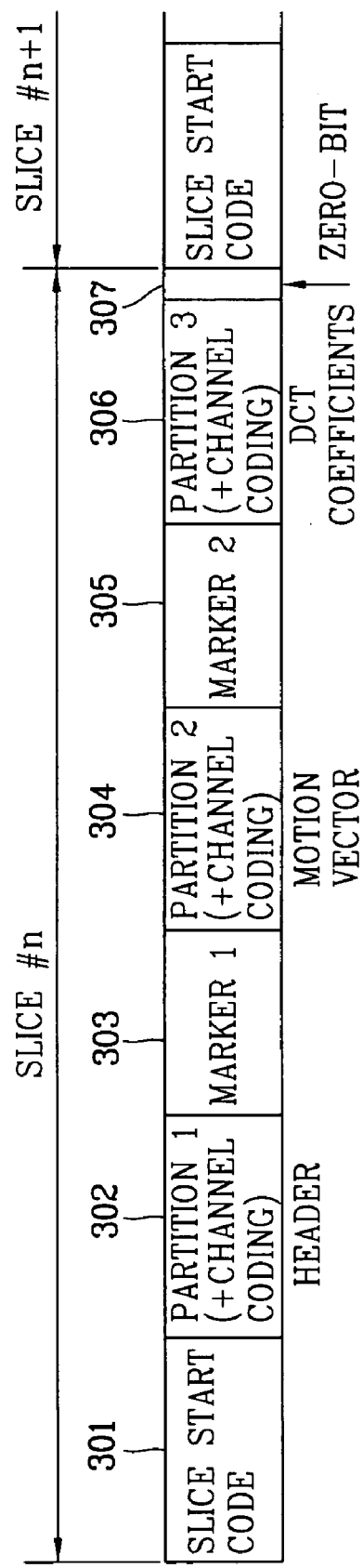
FIG. 7 is a drawing illustrating a bit stream structure for showing a video data coding method using a marker in accordance with a second embodiment of the present invention.

FIG. 7 is a drawing illustrating a bit stream structure according a video data coding method using the marker in accordance with a preferred embodiment of the present invention.

As shown in FIG. 7, the video data coding method using the marker of the present invention is different from the conventional data partitioning technique in that the channel coding is performed on the partitions, and can be easily implemented by an encoder as shown in FIG. 8.

Since the video data coding method using the marker also employs the channel coding method, a partition data should be divided by a block unit. For this purpose, the VLC 21 divides the partition data into blocks by inserting markers and temporarily stores the divided partition data in a buffer (not shown).

The channel coder 22 performs a channel coding (the reed-solomon coding) of a byte unit on the partition data of the partitions 1 and 2 stored in the buffer with reference to the index of the CCRT. At this time, the number of the channel coding byte is computed by equation (1).

FIGS. 9A and 9B illustrate a bit stream structure of the channel coded video data.

FIG. 9A is a partition data divided by a 10 byte block size, including 10 byte blocks 401~402, 5 byte block 403, 3 bit zero bit (404) and markers 1 or 2 303 or 305.

Assuming that the CCRT is 0.5, when the number of channel coding bits to be inserted is computed according to equation (1), each number would be 5 byte, 5 byte and 3 byte for the blocks 401~403.

Figures 10A, 10B:
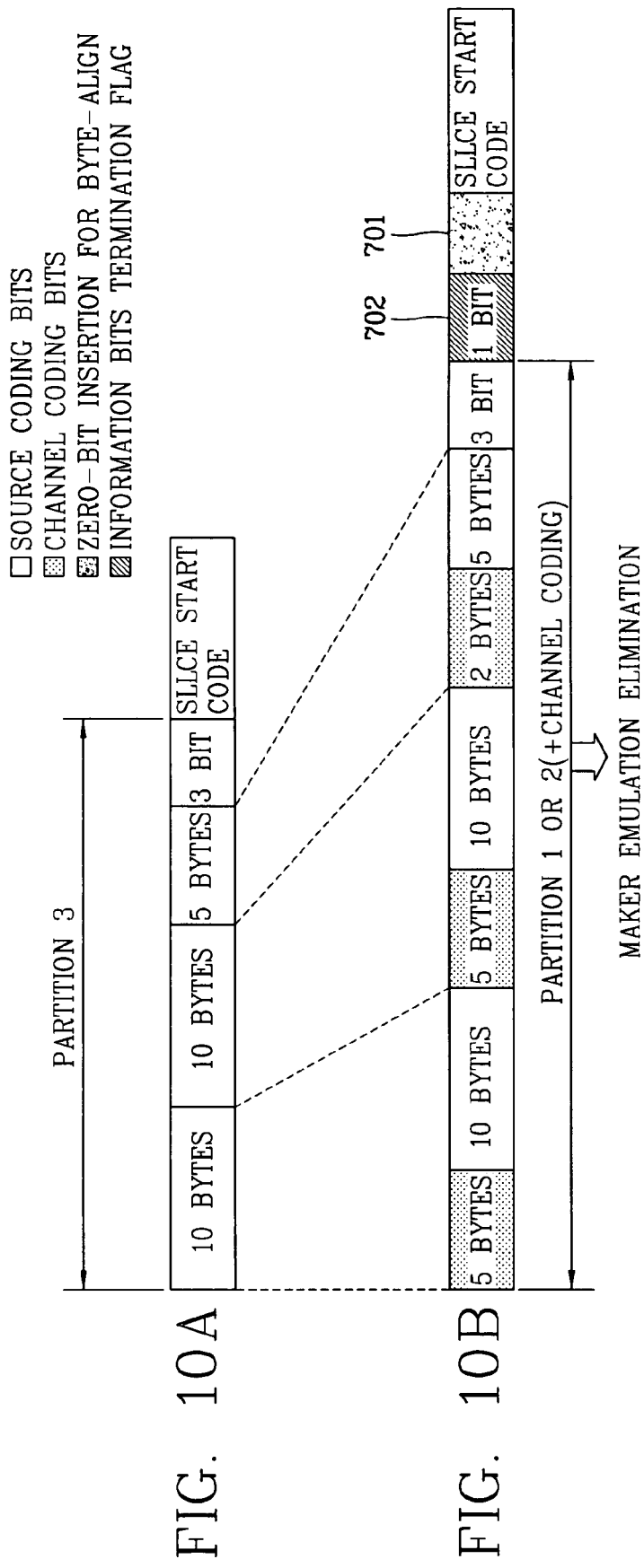
FIGS. 10A and 10B are drawings illustrating an insertion structure of an information bit termination flag indicating the number of zero bits inserted into a partition 3 in accordance with the second embodiment of the present invention.

A zero bit 701 for a byte aligning is inserted into the partition 3. Generally, the zero bit 701 is located after the information bit, thus the decoder can not recognize how many zero bits have been actually inserted. Thus, as shown in FIGS. 10A and 10B, the channel coder 22 forcefully inserts an information bit termination bit 702 of 1 bit at the end of the information bit so that the decoder can easily recognize the zero bit.

After the channel coding operation is completed on the partitions 1, 2 and 3, the partition mixer 23 mixes the partition 1, 2 and 3 302, 304 and 305 outputted from the channel coder 22 and outputs them to a marker e-mulation eliminator 24. Then, the emulation eliminator 24 performs a marker emulation removal operation as follows.

FIGS. 11A through 11C illustrate one example of removal of the marker emulation.

First, the marker emulation eliminator 24 checks whether a marker emulation has generated to the mixed partition data.

That is, for the partition data channel-coded as shown in FIG. 11A, the marker emulation eliminator 24 generates a window having a least significant bit (LSB) which is 2 bits shorter than the marker bit.

For example, if the marker is 0000001, the window becomes 00000. In this state, the marker emulation eliminator 24 checks whether there is a portion matching the window while sliding the window in turn for the channel-coded information bits 501, the channel coding bit 502 and the information bits 503.

If a portion that matches the window as shown in FIG. 11B is detected, since it signifies that there is a possibility that a marker emulation occurs in the next portion, the marker emulation eliminator 24 forcefully inserts 1bit thereinto in order to avoid a marker emulation as shown in FIG. 11C.

Figure 12:
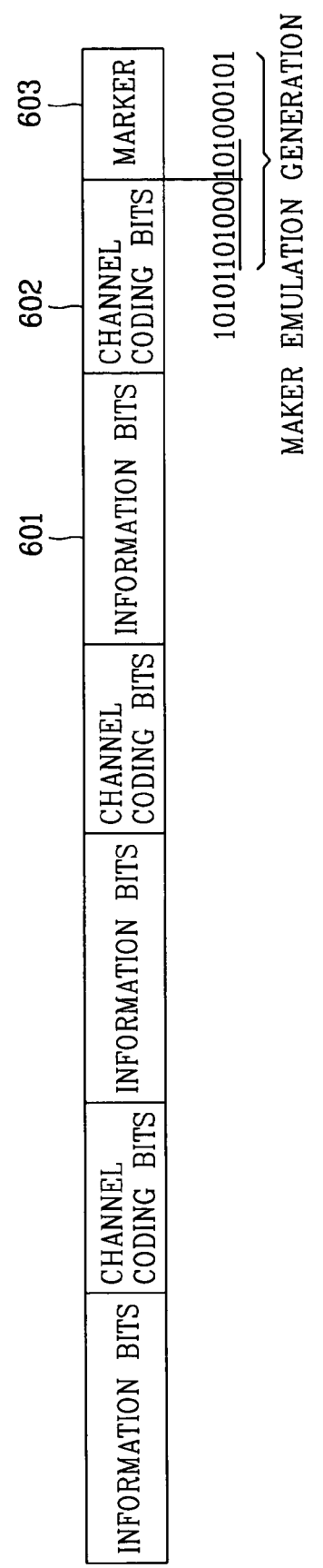
FIG. 12 is a drawing illustrating one example of a marker emulation possibly generated between a data (a channel coding bit) and a marker.

The marker emulation may be also generated between a data (a channel coding bit) 602 and the marker 603 as shown in FIG. 12, as well as being generated between the data as shown in FIG. 11A.

If the marker emulation is generated between the data 602 and the marker 603, the decoder is not able to discover a real marker 603. The reason for this is that, in case of adopting the method including also the marker, the bit '1' is inserted in the middle of the marker, resulting in that the marker 603 itself is deformed as shown in FIG. 12.

In order to avoid such a phenomenon, the bit '1' is to be inserted right in front of the marker. In such a case, however, the encoder would be complicated in its construction and it is not easy to perform a decoding.

Figure 13:
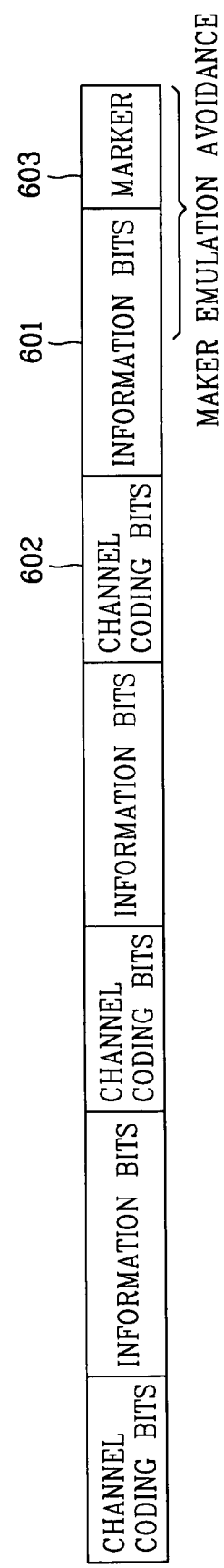
FIG. 13 is a drawing illustrating a bit stream structure in which an information bit and a channel coding bit have been transposed in their positions so as to remove a marker emulation as generated in FIGS. 11A and 11C.

Accordingly, in the present invention, based on the fact that the marker is originally made so that it can not be comprised of a code combination of information bits. Thus, as shown in FIG. 13, by transposing the information bit 601 and the channel coding bit 602, the marker emulation generated even between the data and the marker is effectively prevented.

After the video data coding operation is completed, the encoder transmits the coded bit stream to a destination and the decoder decodes the received bit stream and restores an original video data.

Figure 14:
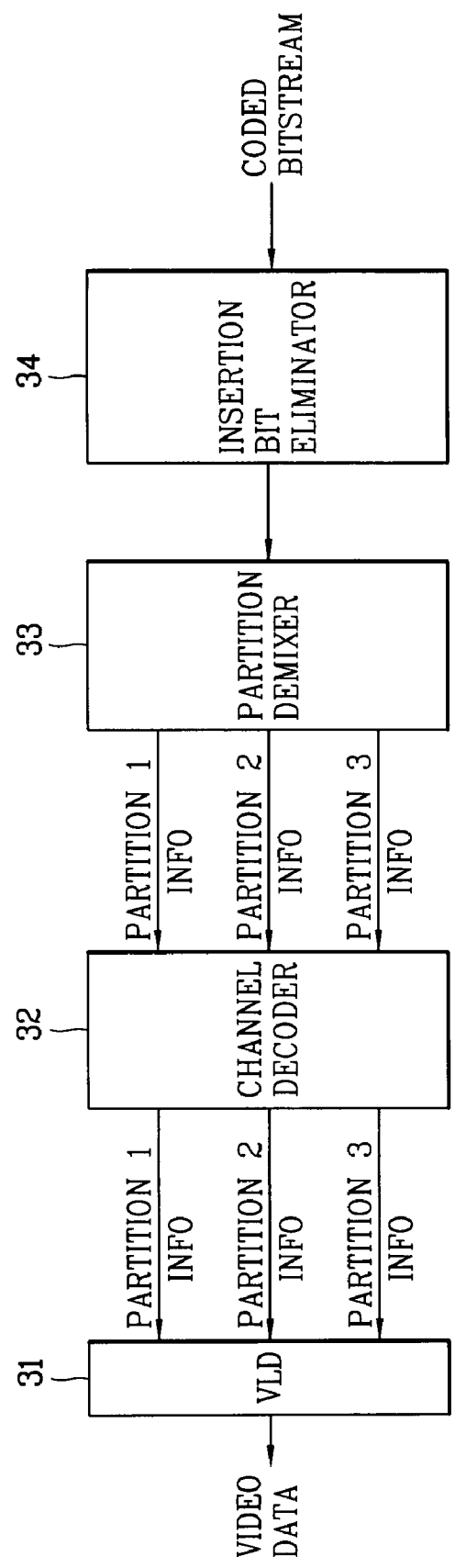
FIG. 14 is a schematic block diagram of a video encoder for implementing a video data coding method using the marker of FIG. 8.

The decoding operation of the decoder will now be described with reference to FIG. 14.

In order to restore an original video data by decoding the received bit stream, the decoder should first determine a total bit amount of the partition and then the information bit amount and an additional bit amount (a channel coding bit amount).

For this purpose, the decoder searches a marker from the first inputted bit stream. Searching operation of the marker and bit removal operation to avoid the marker emulation are simultaneously performed. That is, an insertion bit eliminator 34 checks the coded bit stream, and if '000.001' is inputted, the insertion bit eliminator 34 removes the far last '1' since it is an insertion bit. If, however, '000001' is not inputted, the insertion bit eliminator 34 checks whether '0000001' is inputted in order to find a marker.

Once the marker is checked, the partition demixer 33 demixes the coded bit stream into partitions 1, 2 and 3 and outputs them to the channel decoder 32. And then, the channel decoder 32 computes a total bit amount of the partitions, an information bit amount and an additional bit amount (a channel coding bit amount) on the basis of the inputted partitions 1, 2 and 3.

In case of the partitions 1 and 2, the total bit amount of each of the two partitions is equivalent to the bit amount between the markers.

In case that one partition is formed with one block, an information bit amount and an additional bit amount are computed by the following 'C' program.

```
Int I,A, Total;
Float temp1, temp2;
Float CCRT[ ];
I=(int)((float)Total/(CCRT[index]+1));
Temp1=(float)Total/(CCRT[index]+1);
Temp2=(float)I;
If(temp1!=temp2)
I++;
A=Total−I;
```

At this time, 'Total' is the number of the total bytes, 'I' is the number of information bytes, and 'A' is the number of additional bytes. That is, the channel coding bit amount is a value obtained by subtracting the number of information bytes (I) from the number of total bytes ('Total'), and the number of information bytes (I) is computed as an integer value of Total/(CCRT[index]+1.

Meanwhile, in case the one partition is formed with a plurality of blocks, an information bit amount and an additional bit amount are computed in the following manner.

That is, assuming that a predetermined block size is 'BLS', an information bit is the BLS for a block corresponding to the size of the BLS and an additional bit is Trunc(BLS*CCRT[index]). A block smaller than the BLS is computed by the following 'C' program.

```
Int Total small_total,small_info,small_addi,temp_total;
float temp1,temp 2;
temp_total=Total1;
small_total=BLS+(int)(CCRT[index]*(float)BLS);
while(temp_total>=samll_total)
{temp_total=small_total;}
small_info=(int)((float)temp_total/(percent+1.));
temp1=(float)temp_total/(percent+1.);
temp2+(float)temp_info
if(temp1!=temp2)
small_info++;
small_addi=small_total-small_info;
```

That is, the partitions are identified as the BLS+Trunc(BLS*CCRT[index] and the residual is 'small-total'. At this time, the information bit is 'small_info' and the additional bit is 'small_addi'.

Accordingly, the channel coding bit amount is a value obtained by subtracting information bit(small-info) from the number of the residual bytes (small_Total) after taking the partition as 'BLS+Trunc(BLS*CCRT[index]', and the information bit(small-info) is computed as an integer value of 'small_Total/(percent+1)'.

In this respect, for the partitions 1 and 2, the markers can be discovered and at the same time the total bit amount is computed as described above. However, in the case of the partition 3, since the zero-bit for the byte-aligning is inserted, a different method should be used. The reason is because even if the marker is found, the number of zero-bits inserted for byte-alignment can not be determined.

In order to indicate the inserted zero bit, the encoder forcefully inserts the information bit termination bit 702 by 1 bit, at the end of the information bit, that is, at the rear of the DCT partition. Thus, after discovering the marker, the decoder removes the information bit termination bit 702 of 1 bit which has been forcefully inserted into the partition 3 and the zero-bit 70 which has been inserted for byte-alignment as shown in FIGS. 10A and 10B. Accordingly, the bit amount after removing those bits is the total bit amount.

As the total bit amount of the partition and the information bit amount and the additional bit amount (the channel coding bit amount) are computed, the channel decoder 32 performs a channel decoding on the partition data and outputs it to the VLD 31, and the VLD 31 source-decodes the channel decoded partition data so as to restore its original video data.

As so far described, the video data coding/decoding apparatus method of the present invention has the following advantages.

That is, for example, an error occurrence probability can be reduced by channel decoding the source-coded video data for each partition. In addition, by removing the marker emulation generated in the channel coding, a mobile image data of a better picture quality can be provided.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A video data coding/decoding apparatus comprising:
   an encoder dividing a partition partitioned by a data partitioning technique into certain blocks, channel-coding the divided block data and transmitting a bit stream, the encoder inserting channel coding information into the partitioned data, the channel coding information including size information of each of the plurality of partitions, wherein the inserted channel coding information relates to an index of a channel coding rate table (CCRT);
   a decoder channel-decoding the bit stream received from the encoder so as to restore a video data, wherein the encoder comprises:
      a variable length coder source-coding the video data, partitioning it into a plurality of partitions, and dividing each partition into certain blocks,
      a channel coder channel-coding the partition data of the divided block, and
      a partition mixer mixing a partition table storing the size information of the plurality of partitions and the plurality of partitions, so as to form the bit stream, and wherein the bit stream comprises:
         a slice start code (SSC),
         the partition table storing the size information of each partition,
         a first partition including a header portion having the information bits of the channel-coded video data,
         a second partition having motion vector (MV) information,
         a third partition having a discrete cosine transform (DCT) coefficient, and
         a zero-bit inserting unit for byte-alignment.

2. The apparatus of claim 1, wherein the encoder divides the partition into a plurality of blocks according to a predetermined block size.

3. The apparatus of claim 1, wherein the channel coding is performed in units of bytes.

4. The apparatus of claim 1, wherein a number of channel coding bytes is computed by the following equation:
   the number of channel coding bytes=Trunc(I*CCRT[index]), wherein 'I' indicates an information byte, CCRT [index] indicates a channel coding rate, and Trunc indicates a truncation operator.

5. The apparatus of claim 1, wherein the decoder comprises:
   a partition demixer partitioning the bit stream into a plurality of partitions with reference to a partition table contained in the received bit stream;
   a channel decoder channel-decoding each partition data according to an index of the CCRT and outputting the source-coded partition; and
   a device mixing the source-coded partitions and performing a source-coding on the partitions so as to restore an original video data.

6. A video data coding/decoding apparatus comprising:
   an encoder dividing a partition partitioned by a data partitioning technique into certain blocks, channel-coding the divided block data and transmitting a bit stream, the encoder inserting channel coding information into the partitioned data, the channel coding information including size information of each of the plurality of partitions, wherein the encoder comprises:
      a variable length coder source-coding a video data and partitioning it into a plurality of partitions, and dividing each of the partitioned partitions into the certain blocks;
      a channel coder channel-coding the partition data of the divided blocks, wherein the channel coder inserts an information bit termination bit at an end of the information bit of partition 3 so as to indicate how many zero bits have been inserted;
      a partition mixer mixing the plurality of channel-coded partitions; and
      a marker emulation eliminator checking whether a marker emulation has occurred in the mixed partitions and performing a marker emulation avoiding operation, and
   a decoder channel-decoding the bit stream received from the encoder so as to restore a video data.

7. A video data coding/decoding apparatus comprising:
   an encoder dividing a partition partitioned by a data partitioning technique into certain blocks, channel-coding the divided block data and transmitting a bit stream, the encoder inserting channel coding information into the partitioned data, the channel coding information including size information of each of the plurality of partitions, wherein the encoder includes:
      a variable length coder source-coding a video data and partitioning it into a plurality of partitions, and dividing each of the partitioned partitions into the certain blocks,
      a channel coder channel-coding the partition data of the divided blocks,
      a partition mixer mixing the plurality of channel-coded partitions, and
      a marker emulation eliminator checking whether a marker emulation has occurred in the mixed partitions and performing a marker emulation avoiding operation, wherein the marker emulation eliminator generates a window which has less bits than the marker bits and checks whether a marker emulation has occurred between the partition data; and
   a decoder channel-decoding the bit stream received from the encoder so as to restore a video data.

8. The apparatus of claim 7, wherein the channel coder inserts an information bit termination bit at the end of the information bit of partition 3 so as to know how many zero bits have been inserted.

9. The apparatus of claim 7, wherein the marker emulation eliminator inserts a predetermined value into the portion next to the portion matching the window in order to avoid a marker emulation when a marker emulation occurs between the partition data.

10. The apparatus of claim 9, wherein the marker emulation eliminator transposes the information bit and the channel coding bit in the partition data when a marker emulation occurs between the data and the marker.

11. A video data coding/decoding apparatus comprising:
an encoder dividing a partition partitioned by a data partitioning technique into certain blocks, channel-coding the divided block data and transmitting a bit stream, the encoder inserting channel coding information into the partitioned data, the channel coding information including size information of each of the plurality of partitions; and
a decoder channel-decoding the bit stream received from the encoder so as to restore a video data, wherein the decoder comprises:
an insertion bit eliminator searching a market and removing bits that have been inserted to avoid a marker emulation from the received bit stream;
a partition demixer demixing the bit stream into a plurality of partitions when a marker is discovered;
a channel decoder computing a total bit amount, an information bit amount and a channel coding bit amount of each partitioned partition and channel-decoding the partition data according to an index of a channel coding rate table (CCRT); and
a variable length decoder mixing the partitions which have been channel-decoded by the channel decoder and performing a source-coding on it so as to restore an original video data.

12. The apparatus of claim 11, wherein the total bit amount is a bit amount between the markers in case of partition 1 and partition 2.

13. The apparatus of claim 11, wherein the channel bit amount is a value obtained by subtracting the number of the information bytes (I) from the number of the total bytes (total), and the number of the information bytes (I) is an integer value of 'Total/(CCRT[index]+1)'.

14. The apparatus of claim 11, wherein in case of one partition is made with a plurality of blocks and certain blocks correspond to a predetermined block size (BLS), the information bit is the block size and an additional bit is Trunc (BLS*CCRT[index]).

15. The apparatus of claim 14, wherein in case that one partition is made with a plurality of blocks and certain blocks are smaller than the BLS, a channel coding bit amount is a value obtained by subtracting the information bits (small-info) from the number of residual bytes (small_Total) by taking the partition as 'BLS+Trunc(BLS*CCRT[index])', and the information bit (small-info) is an integer value of small_Total/(percent+1).

16. The apparatus of claim 11, wherein the total bit amount is equivalent to a bit amount except for the information bit termination bit inserted at the rear end of the DCT partition and the zero-bit inserted for byte-alignment, in case of partition 3.

17. A video data coding method comprising:
partitioning a source-coded video data into a plurality of partitions and dividing each partition into certain blocks according to a predetermined block size;
inserting a channel coding byte into each divided block and channel-coding a partition data; and
mixing a partition table storing size information of each of the partitions and the channel coded partitions so as to form a bit stream, wherein the channel coding is performed in units of bytes, and a number of the channel coding bytes is computed by the following equation:
the number of channel coding bytes=Trunc(I*CCRT[index]), wherein 'I' indicates an information byte, CCRT[index] indicates a channel coding rate, and Trunc indicates a truncation operator.

18. The method of claim 17, wherein the bit stream comprises:
a slice start code (SSC);
the partition table storing the size information of each partition;
a first partition including a header portion having the information bits of the channel-coded video data;
a second partition having motion vector (MV) information;
a third partition having a discrete cosine transform(DCT) coefficient; and
a zero-bit inserting unit for a byte-aligning.

19. A video data decoding method comprising:
partitioning a bit stream into a plurality of partitions with reference to a partition table included in the received bit stream, the partition table including size information of each of the partitions;
channel-coding each partition data according to an index of a CCRT and outputting the source-coded partition; and
mixing the source-coded partitions and performing a source-decoding on the partitions so as to restore an original video data, wherein the bit stream comprises:
a slice start code (SSC),
the partition table storing the size information of each partition,
a first partition including a header portion having the information bits of the channel-coded video data,
a second partition having motion vector (MV) information,
a third partition having a discrete cosine transform PCT) coefficient, and
a zero-bit inserting unit for a byte-aligning.

20. A video data coding method comprising:
inserting a marker into a source-coded video data, partitioning it into a plurality of partitions, and dividing each partition into certain block according to a predetermined block size;
channel-coding the partition data of the divided blocks;
mixing the plurality of channel-coded partitions; and
checking whether a marker emulation has occurred in the mixed partitions and performing a process to avoid a marker emulation, wherein the process to avoid a marker emulation includes:
generating a window having less bits than the marker bit,
checking whether a marker emulation has occurred between the partition data while sliding the generated window, and
inserting a certain value at a next portion of a portion that matches the window to avoid a marker emulation when the marker emulation is generated between the partition data.

21. The method of claim 20, wherein the channel coding is performed in units of bytes.

22. The method of claim 21, wherein the channel coding comprises:
computing channel coding information with reference to an index of a channel coding rate table (CCRT); and
inserting the computed channel coding byte into the partition data of each block and performing a channel coding.

23. The method of claim 22, wherein the channel coding information is performed in units of bytes and is computed by the following equation:

the number of channel coding bytes=Trunc(I*CCRT[index]), wherein 'I' indicates an information byte, CCRT[index] indicates a channel coding rate, and Trunc indicates a truncation operator.

24. The method of claim 22, further comprising inserting an information bit termination bit of a certain bit at the end of the information bit of partition 3 so as to recognize a zero bit during the channel-coding.

25. The method of claim 20, further comprising transposing an information bit and a channel coding bit in the partition data when the marker emulation is generated between the data and the marker.

26. A video data decoding method comprising:
   searching a marker while removing bits inserted to avoid a marker emulation from a received bit stream;
   demixing the bit stream to a plurality of partitions when a marker is discovered;
   computing a total bit amount, an information bit amount and a channel coding bit amount of each partitioned partition and channel-decoding the partition data according to an index of a channel coding rate table (CCRT); and
   mixing the channel-decoded partitions, and performing a source-decoding on the partitions so as to restore an original video data.

27. The method of claim 26, wherein the total bit amount is a bit amount between the markers, in case of partition 1 and partition 2.

28. The method of claim 26, wherein the channel bit amount is a value obtained by subtracting the number of the information bytes (I) from the number of the total bytes (Total), and the number of the information bytes (I) is an integer value of 'Total/(CCRT[index]+1)'.

29. The method of claim 26, wherein in case that one partition is made with a plurality of blocks and certain blocks correspond to a predetermined block size (BLS), the information bit is the block size and an additional bit is Trunc(BLS*CCRT[index]).

30. The method of claim 26, wherein in case that one partition is made with a plurality of blocks and certain blocks are smaller than the BLS, a channel coding bit amount is a value obtained by subtracting the information bits (small-info) from the number of residual bytes (small_Total) by taking the partition as 'BLS+Trunc (BLS*CCRT[index])', and the information bit (small-info) is an integer value of small_Total/(percent+1).

31. The method of claim 26, wherein the total bit amount is equivalent to a bit amount except for the information bit termination bit inserted at the rear end of the DCT partition and the zero-bit inserted for a byte-aligning, in case of partition 3.

* * * * *